United States Patent [19]

Gaw

[11] 4,058,461
[45] Nov. 15, 1977

[54] OIL SALVAGE SHIP WITH OCEAN GOING BOW

[76] Inventor: Thomas I. Gaw, 12 Fuller Place, Brooklyn, N.Y. 11215

[21] Appl. No.: 729,652

[22] Filed: Oct. 5, 1976

[51] Int. Cl.² ............................................. E02B 15/04
[52] U.S. Cl. ........................ 210/242 S; 210/DIG. 25
[58] Field of Search ................ 210/83, 242, DIG. 25

[56] References Cited

U.S. PATENT DOCUMENTS

| | | | |
|---|---|---|---|
| 3,576,257 | 4/1971 | Yates | 210/242 |
| 3,651,943 | 3/1972 | Di Perna | 210/242 |
| 3,695,441 | 10/1972 | Baghis | 210/242 |
| 3,708,070 | 1/1973 | Bell | 210/242 |
| 3,752,317 | 8/1973 | Lithen | 210/242 |
| 3,754,653 | 8/1973 | Verdin | 210/DIG. 25 |
| 3,756,414 | 9/1973 | Crisafulli | 210/242 |
| 3,860,519 | 1/1975 | Weatherford | 210/242 |
| 3,922,225 | 11/1975 | Strain | 210/242 |
| 3,929,644 | 12/1975 | Fletcher | 210/242 |
| 3,957,646 | 5/1976 | Wickert | 210/DIG. 25 |

*Primary Examiner*—Theodore A. Granger

[57] ABSTRACT

A tanker ship designed with a bow so to scoop up spilled oil from a surface of a sea; the ship including a doorway at the water level for admitting oil and surface water as the ship moves ahead, and which is pumped into settling tanks from which the water is pumped overboard so that only the oil is collected; the bow having two hinged doors at the bow behind which a rearwardly converging vestibule or scoop having a rear vertical plate with grid-screened ports at all levels, a selected one of which is opened to admit the surface oil.

3 Claims, 8 Drawing Figures

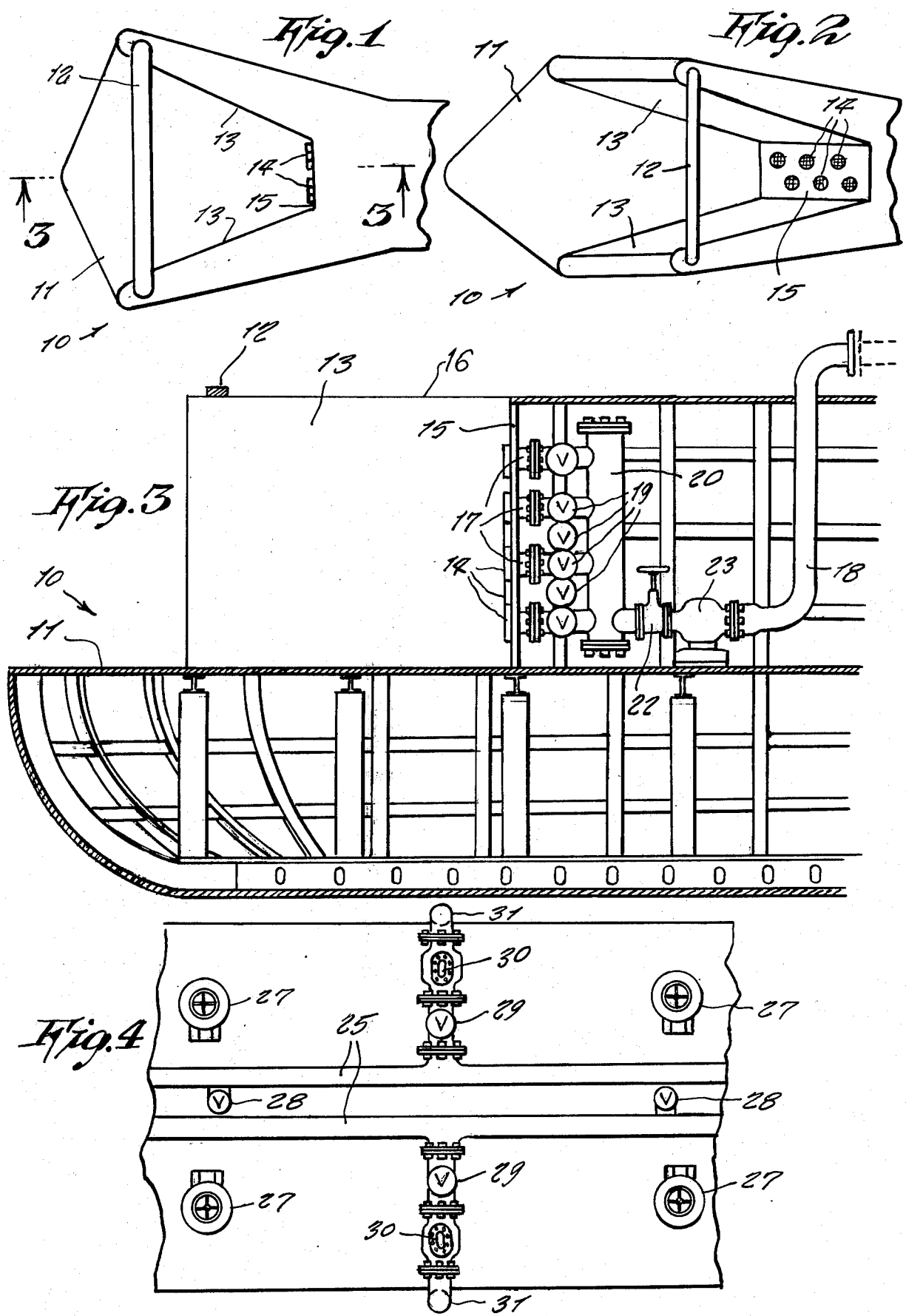

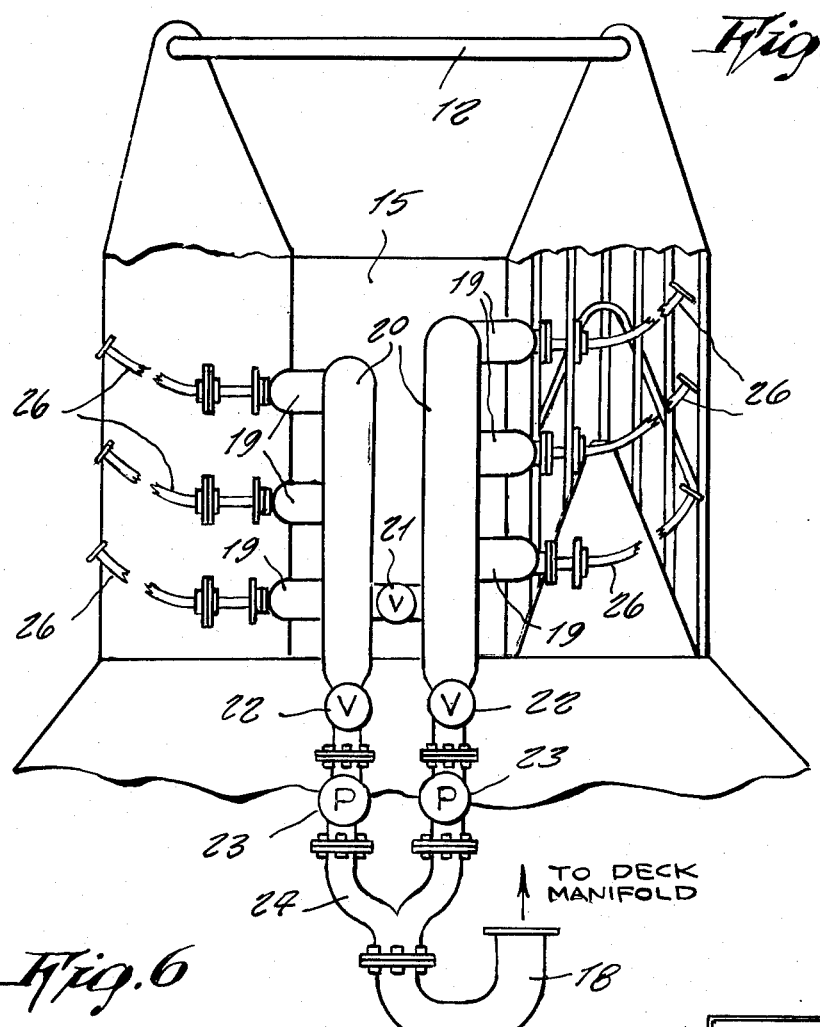
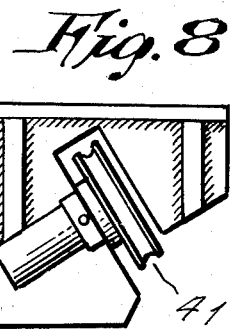
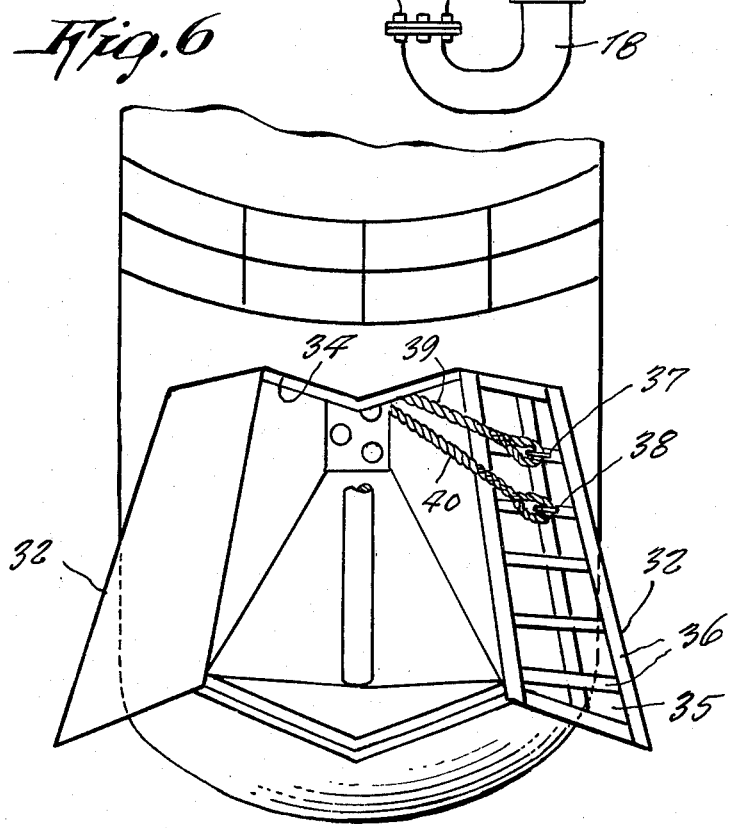
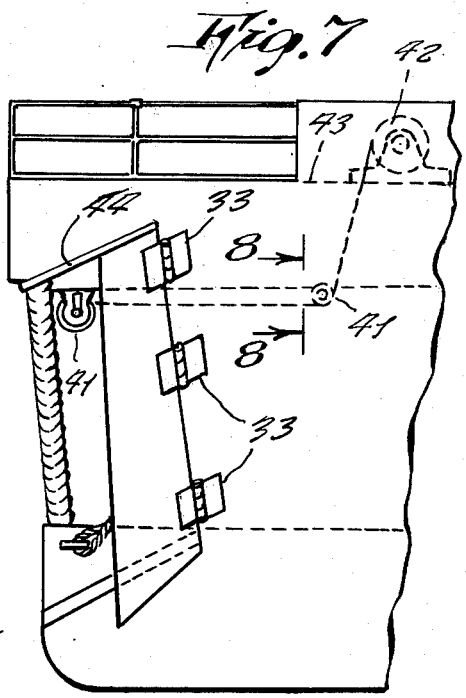

OIL SALVAGE SHIP WITH OCEAN GOING BOW

This invention relates generally to apparatus for collecting spilled oil from the surfaces of seas. More specifically it relates to an oil gathering ship.

A principal object of the present invention is to provide a ship having a specifically designed bow that opens up at the water level so to admit oil from the water surface and collct it within tanks for transportation away; thus leaving the water surface clean of any oil scum that is damaging to wild life such as birds who land on a water surface and which spoils bathing beaches and shore installations that result in expensive cleanup.

Another object is to provide an oil salvage ship which can quickly travel to an area of an oil tanker collision, whether offshore on a high sea or within a harbor, and immediately go into action sweeping up spilled oil upon reaching the scene.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a top plan view of a ship bow shown incorporating the present invention.

FIG. 2 is a perspective view thereof.

FIG. 3 is a side cross-sectional view of a bow collecting scoop as viewed on line 3—3 of FIG. 1.

FIG. 4 is a view showing a section of a tanker main deck and components thereof.

FIG. 5 is an inboard bow mechanism shown in rear top perspective.

FIG. 6 is a front view of the bow shown with bow doors in an opened position.

FIG. 7 is a side view thereof.

FIG. 8 is a detail view taken on line 8—8 of FIG. 7, and shown enlarged, and illustrating a pulley unit for the bow door operating mechanism.

Referring now to the drawings in greater detail, the reference numeral 10 represents an oil salvage ship with ocean-going bow wherein there is a submersible hull bow 11 having a scoop tie bar 12, scoop 13, grids 14, bow valve plate 15, and main deck and scoop extensions 16. These are all clearly visible in FIG. 3. More grids and valves may be added, as required. The steel valve plate 15 is made of a substantial thickness and strength so to withstand the force of the water.

Port valve extensions 17 provide connections to a deck manifold 18 that leads upward upon the ship deck. Gate valves 19, are bolted to the ports of bow plate 15, and manifolds 20 are connected to valves 19. A valve 21 communicates between both manifolds 20, and the outlets of manifolds 20 are connected to back-up valves 22 which connects to pumps 23 which connect to collecting Y-pipe 24 leading to the deck manifold 25 and to the ship tanks. The collecting valves 19 are operated by remote control operating valve cables 26.

As shown in FIG. 2, the grid covered port openings of 17 are at all water levels so that depending upon the vessel draft at any time, a selected one of the gate valves 19 is opened so to admit oil from the sea water surface.

FIGS. 2 and 3 show that at any draft of the ship there is a port which aligns with the sea surface.

In FIG. 4, a means is shown for separating the oil from water that is also taken in when the oil is scooped up. Tank ventilating hatches 27 are shown in FIG. 4, and the figure also shows tank valves 28 connected to deck manifolds 25. Overboard discharge valves 29 communicate with manifolds 25. Sight feed units 30 of the overboard discharge and overboard discharge pipes 31.

Reference is now made more particularly to FIGS. 6, 7, and 8 of the drawings, the bow 11 is shown to include two doors 32 each of which is pivotable about hinges 33 so to swing sidewardly and open up a doorway 34 at the point of the bow, the doors extending downwardly below and upwardly above the sea level so that the oil upon the surface of the sea can be admitted into the doorway 34 of the ship as the vessel sweeps up an oil spill. Each door consists of steel plates 35 mounted on a frame 36, the frame having eyelets 37 and 38 to which cables 39 and 40 are respectively secured, the cables being passed around pulleys 41 to a winch 42 upon the deck 43 so to pull the doors open or closed. Sealing strips 44 all around the door and doorway edge secure the opening against water leakage.

A support post 45 at the bow tip aligns to abut the mating edges of the two doors. Means are also provided for controlling the outwardly opening of the doors in order to admit the sea water.

In operative use, the ship will cruise at a low rate of speed, to be determined by test in the oil spill area. Heading into the spill, the scoop will pick up oil and water, and concentrate them at the rate of the scoop. Here the valves on the bow valve plate come into action. The lowest valve is opened first and the pump is turned on, forcing the water and oil up the connecting pipes to the deck manifolds and from here to the tanks on the vessel. The ship will be low in the water when all the tanks are full.

The valve efficiency is rated by the amount of oil that it collects. When totally submerged the valve should be closed and the adjacent valve opened. This procedure is carried out until all the tanks are filled.

The tanks should be allowed to settle for one or two hours. After this period of settling, the water is separated from the oil, and the water is then pumped out of the tanks through the overboard discharge pipes. The sight feed units are observed during this pumping action so to stop further pumping at once when the oil starts to flow into the overboard discharge pipes. After the tank pumping is stopped for the particular tank, a pumping action can then commence for a next tank containing both oil and water. After all the tanks are emptied of their water, while retaining the collected oil, the ship can then again proceed to gather more oil from the sea surface as above described, depositing the additional mixture of oil and water upon the already collected oil in the tanks. Thereafter, following a settling period, the additional water is pumped out. In this repeated manner of operation, the tanks can be filled with only the oil, which is then transported away to an oil refinery installation ashore where the oil is sold and refined for use.

Thus oil spills at sea or in harbors caused by tanker collisions, off shore oil wells and the like can be efficiently cleaned up.

Thus a ship is designed for salvaging spilled oil from a sea surface.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed:

1. An oil salvage ship, comprising in combination, a hull having a doorway at its bow closable by a pair of doors, a rearwardly converging vestibule behind said doorway forming a scoop as part of said ship and having a rear vertical plate, a plurality of selectively openable grid-screened ports at different elevations through said plate, said ports communicating with an oil collection system on said ship; whereby as the draft of the ship varies, at least one port will be at the water surface to admit surface oil.

2. The combination as set forth in claim 1 wherein said oil collection system includes a pipe extension from each said pot being fitted with a valve, said extensions being connected to a manifold leading toward storage tanks.

3. The combination as set forth in claim 2 wherein said bow doors are connected to cables which at one end are wound up on winches for pulling said doors open or closed.

* * * * *